United States Patent
Kobayashi et al.

(10) Patent No.: US 9,792,938 B1
(45) Date of Patent: Oct. 17, 2017

(54) DATA STORAGE DEVICE COMMUNICATING SERVO INFORMATION BETWEEN SERVO CHANNELS OF MULTIPLE ACTUATORS

(71) Applicant: Western Digital Technologies, Inc., San Jose, CA (US)

(72) Inventors: Masahito Kobayashi, Newport Beach, CA (US); Bryan Rowan, San Jose, CA (US); Tetsuo Semba, Zama (JP); Kevin Tzou, San Jose, CA (US); Gary Herbst, San Jose, CA (US)

(73) Assignee: Western Digial Technologies, Inc., San Jose, CA (US)

( * ) Notice: Subject to any disclaimer, the term of this patent is extended or adjusted under 35 U.S.C. 154(b) by 0 days.

(21) Appl. No.: 15/585,779

(22) Filed: May 3, 2017

(51) Int. Cl.
*G11B 5/55* (2006.01)
*G11B 5/596* (2006.01)

(52) U.S. Cl.
CPC .......... *G11B 5/5578* (2013.01); *G11B 5/556* (2013.01); *G11B 5/59694* (2013.01)

(58) Field of Classification Search
CPC .............. G11B 5/012; G11B 5/02; G11B 5/5552–5/5565; G11B 5/5578–5/5582; G11B 5/59694
USPC .. 360/55, 69, 75, 77.01–77.08, 78.05, 78.12
See application file for complete search history.

(56) References Cited

U.S. PATENT DOCUMENTS

| | | | | |
|---|---|---|---|---|
| 5,341,351 A | * | 8/1994 | Ng ...................... | G06F 3/0601 360/78.12 |
| 5,355,486 A | * | 10/1994 | Cornaby .............. | G11B 5/5578 360/78.12 |
| 5,610,808 A | * | 3/1997 | Squires ................ | G11B 5/5578 360/78.12 |

(Continued)

FOREIGN PATENT DOCUMENTS

WO 2016053195 A1 7/2016

OTHER PUBLICATIONS

D. Chunling, G. Guo, J. Zhang, "Interaction Rejection of Multiple Microactuators in Dual-Stage Servos for Hard Disk Drives" IEEE Transactions on Control Systems Technology, vol. 14, No. 3, May 2006.

*Primary Examiner* — Wayne Young
*Assistant Examiner* — James L Habermehl (57) ABSTRACT

A data storage device is disclosed comprising a first disk comprising first servo sectors $A_0$-$A_N$ distributed around a circumference of the first disk, and a second disk comprising second servo sectors $B_0$-$B_N$ distributed around a circumference of the second disk, wherein the second servo sectors $B_0$-$B_N$ are offset circumferentially from the first servo sectors $A_0$-$A_N$. While the first and second disks are rotating second servo information is transmitted from a second servo channel to a first servo channel. One of the first servo sectors Ai is read to generate first servo information, and a first command value is generated based on the first servo information and the second servo information, wherein a first actuator is controlled based on the first command value.

18 Claims, 6 Drawing Sheets

(56) References Cited

U.S. PATENT DOCUMENTS

| | | | | |
|---|---|---|---|---|
| 6,005,743 A * | 12/1999 | Price | | G11B 21/083 360/78.12 |
| 6,490,138 B1 | 12/2002 | Prater | | |
| 6,493,172 B1 * | 12/2002 | Morris | | G11B 5/5552 360/78.12 |
| 6,519,109 B1 * | 2/2003 | Price | | G11B 5/59605 360/78.12 |
| 6,563,657 B1 * | 5/2003 | Serrano | | G11B 5/5578 360/69 |
| 6,687,092 B2 | 2/2004 | Kan et al. | | |
| 6,747,836 B2 | 6/2004 | Stevens et al. | | |
| 6,765,743 B2 | 7/2004 | Goodman et al. | | |
| 6,847,504 B1 * | 1/2005 | Bennett | | G11B 5/4833 360/78.12 |
| 6,952,322 B1 * | 10/2005 | Codilian | | G11B 5/59694 360/77.05 |
| 7,102,842 B1 * | 9/2006 | Howard | | G11B 5/5521 360/78.12 |
| 7,245,448 B2 * | 7/2007 | Urata | | G11B 5/59694 360/77.05 |
| 7,277,258 B2 | 10/2007 | Hirano et al. | | |
| 7,324,301 B2 * | 1/2008 | Tormasi | | G11B 5/02 360/78.12 |
| 7,486,470 B1 | 2/2009 | Semba | | |
| 7,760,463 B2 * | 7/2010 | Ward | | G11B 21/025 360/78.12 |
| 8,743,503 B1 | 6/2014 | Tang et al. | | |
| 8,896,955 B1 | 11/2014 | Chen et al. | | |
| 9,147,419 B2 | 9/2015 | Oberg et al. | | |
| 9,177,582 B1 * | 11/2015 | Kawabe | | G11B 5/59694 |
| 9,361,919 B1 * | 6/2016 | Lieu | | G11B 5/556 |
| 2002/0067566 A1 * | 6/2002 | Arkin | | G11B 5/012 360/77.05 |
| 2003/0161067 A1 * | 8/2003 | Ramler | | G11B 5/02 360/77.05 |
| 2004/0004781 A1 | 1/2004 | Kobayashi et al. | | |
| 2007/0183076 A1 | 8/2007 | Baugh et al. | | |

* cited by examiner

DATA STORAGE DEVICE COMMUNICATING SERVO INFORMATION BETWEEN SERVO CHANNELS OF MULTIPLE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
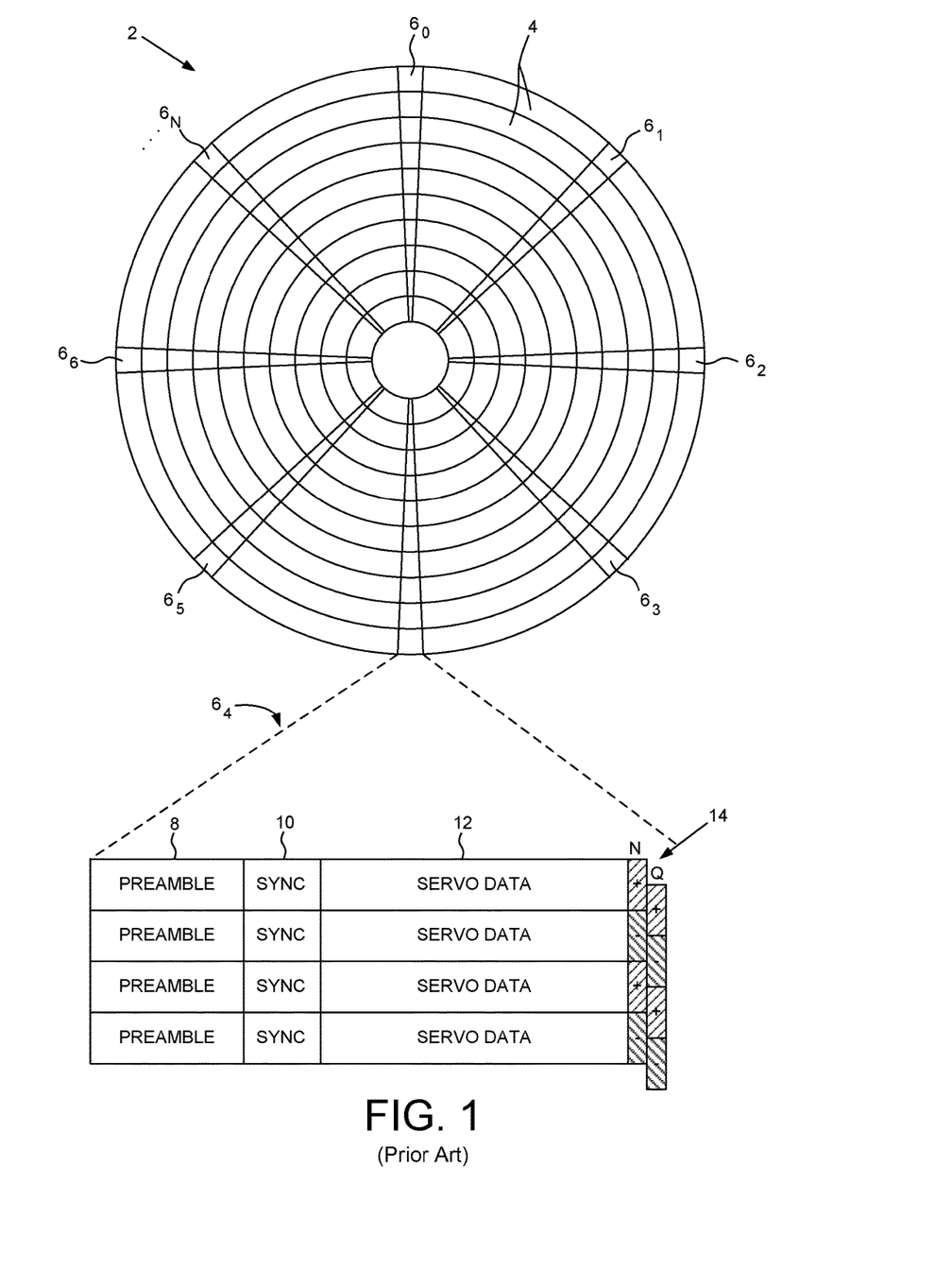
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
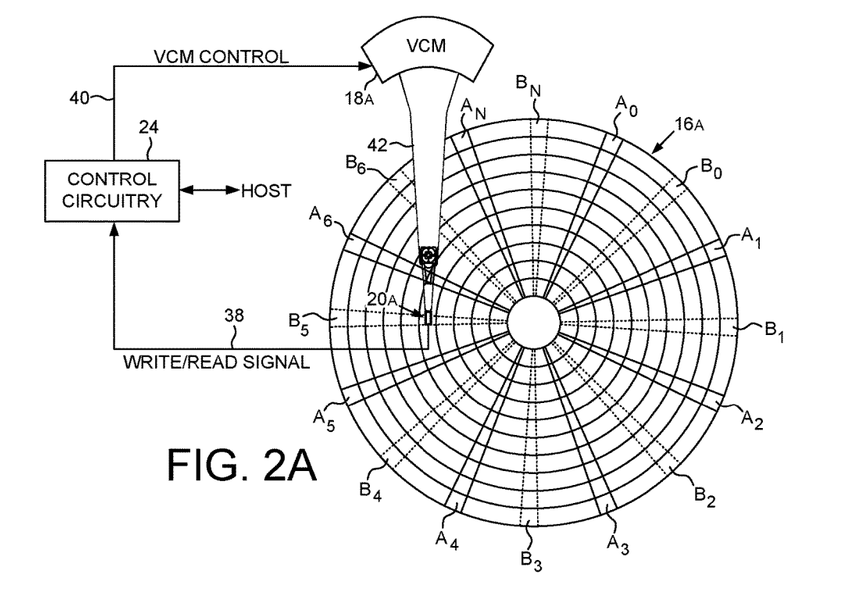
FIGS. 2A and 2B show a data storage device in the form of a disk drive comprising plurality of disks and a multi-actuator servo system for actuating respective heads over each disk surface.
Figure 2B:
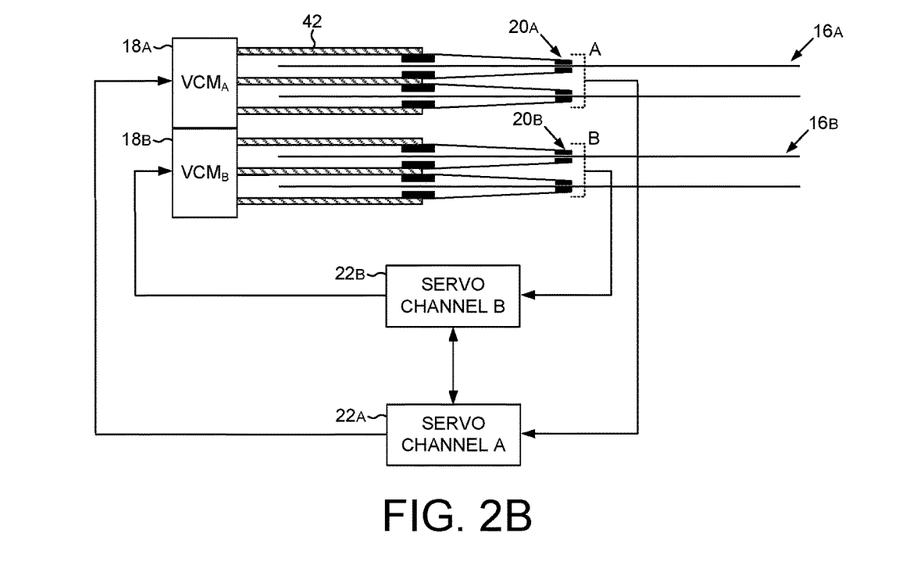
Figure 4:
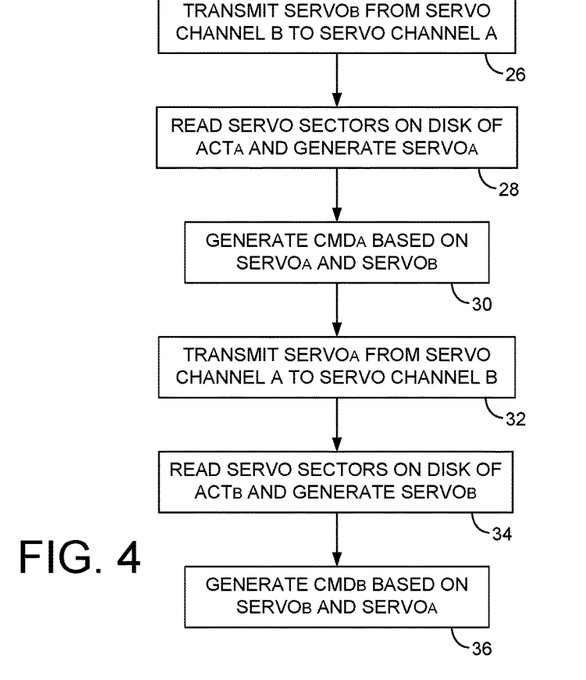
FIG. 4 is a flow diagram according to an embodiment wherein servo information received from a second servo channel is used to generate a control signal applied to a first actuator of a first servo channel to compensate for a coupling disturbance from a second actuator of the second servo channel.

FIGS. 2A and 2B show a data storage device in the form a disk drive according to an embodiment. A first disk 16A comprises first servo sectors $A_0$-$A_N$ distributed around a circumference of the first disk 16A, a first actuator 18A is configured to actuate a first head 20A over the first disk 16A, and a first servo channel 22A is configured to control the first actuator 18A. A second disk 16B comprises second servo sectors $B_0$-$B_N$ distributed around a circumference of the second disk 16B, wherein the second servo sectors $B_0$-$B_N$ are offset circumferentially from the first servo sectors $A_0$-$A_N$, a second actuator 18B is configured to actuate a second head 20B over the second disk 16B, and a second servo channel 22B is configured to control the second actuator 18B. The disk drive further comprises control circuitry 24 comprising the first and second servo channels 22A and 22B, wherein while the first and second disks 16A and 16B are rotating the control circuitry 24 is configured to execute the flow diagram of FIG. 4. Second servo information is transmitted (step 26) from the second servo channel to the first servo channel. One of the first servo sectors Ai is read to generate first servo information (block 28), and a first command value is generated based on the first servo information and the second servo information (block 30), wherein the first actuator is controlled based on the first command value. First servo information is transmitted from the first servo channel to the second servo channel (block 32). One of the second servo sectors Bi is read to generate second servo information (block 34), and a second command value is generated based on the first servo information and the second servo information (block 36), wherein the second actuator is controlled based on the second command value.

In the embodiment of FIG. 2A, each disk comprises a plurality of servo sectors that define a plurality of servo tracks, wherein data tracks are defined relative to the servo tracks at the same or different radial density. The control circuitry 24 processes a read signal 38 emanating from the respective head to demodulate the servo sectors and generate a position error signal (PES) representing an error between the actual position of the head and a target position relative to a target track. A servo control system in the control circuitry 24 filters the PES using a suitable compensation filter to generate a control signal 40 applied to a voice coil motor (VCM) 18A which rotates an actuator arm 42 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable actuators may be employed to actuate the heads over the respective disks. In the embodiment of FIG. 2B, the first actuator 18A comprises a first $VCM_A$ and the second actuator 18B comprises a second $VCM_B$ which rotate respective actuator arms about a common shaft. In the example of FIG. 2B, each VCM rotates three actuator arms about the common pivot so as to actuator eight heads over respective disk surfaces (four for each actuator). However, other embodiments may employ any suitable number of VCMs which may rotate any suitable number of actuator arms about the common pivot.

In one embodiment, one of the heads controlled by each actuator may be active at a time to execute an access operation (write or read), thereby enabling the concurrent execution of multiple access operations so as to increase the throughput of the disk drive. In the example of FIG. 2B, one of the A heads may be active and one of the B heads may be active to enable the concurrent execution of two access operations. In one embodiment, both of the actuators may be controlled during an access operation to track a centerline of a data track, both actuators may be controlled to seek the A and B heads to respective data tracks, or one actuator may perform a tracking operation while the other actuator performs a seek operation. Regardless as to the operation executed by each servo channel, in one embodiment servo information may be transmitted cross-channel so as to improve the servoing performance of both actuators.

In one embodiment, it may be desirable to control the multiple actuators (e.g., multiple VCMs) using a multiple input multiple output (MIMO) control system. For example, in one embodiment it may be desirable to attenuate a coupling disturbance from the second actuator 18B when tracking a data track on the first disk 16A using the first actuator 18A. In order to attenuate this coupling disturbance, in one embodiment servo information from the second servo channel 22B may be transmitted to the first servo channel 22A and used to generate the control signal applied to the first actuator 18A. There may be a similar cross-channel transfer of servo information when tracking a servo track on the second disk 16B in order to attenuate a coupling disturbance from the first actuator 18A. Any suitable servo information may be transmitted between the servo channels, such as the PES generated by the servo channel, a command value for generating the control signal applied to the respective actuators, state information generated by a state estimator, a seek profile used to seek a respective head to a target track, coarse component of the PES, fine component of the PES, status of the servo channel (seeking, reading, writing, write inhibit, etc.), active head number, or radial location of the head (e.g., inner, middle, or outer diameter). In one embodiment, at least one actuator 18A and/or 18B may comprise a microactuator, such as a piezoelectric actuator that couples a suspension to a distal end of a respective actuator arm. In one embodiment, the servo information transmitted between servo channels may relate to the control of the microactuator, such as a command value used to generate the control signal applied to the microactuator.

Figure 3A:
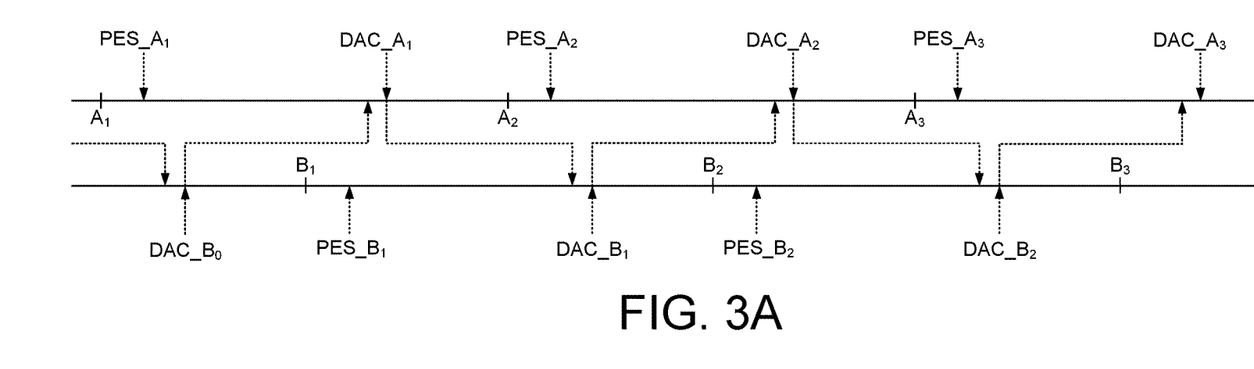
FIG. 3A shows an embodiment wherein servo information is transmitted cross-channel half duplex.

FIG. 3A shows an embodiment wherein the first servo sectors $A_0$-$A_N$ are distributed evenly around the circumference of the first disk 16A and separated by a servo sample interval, the second servo sectors $B_0$-$B_N$ are distributed evenly around the circumference of the second disk 16B and separated by the servo sample interval, wherein the second servo sectors $B_0$-$B_N$ are offset circumferentially from the first servo sectors $A_0$-$A_N$ by a half servo sample interval. In this embodiment, each servo channel generates a command value (e.g., a digital-to-analog conversion (DAC) value) based on the PES generated by reading a servo sector together with the cross-channel servo information which, in this embodiment, comprises the DAC value generated by the other servo channel. Also in this embodiment, it requires over half of the servo sample interval to generate the PES and corresponding DAC value. For example, after reading servo sector $A_3$ and generating the corresponding PES_$A_3$, the first servo channel generates DAC_$A_3$ based on PES_$A_3$ and DAC_$B_1$ generated from reading servo sector $B_1$. In this embodiment, there is a delay of approximately 1.5 servo sample intervals between when the cross-channel DAC value is generated (DAC_$B_1$) and when the first servo channel DAC value (DAC_$A_3$) is generated. In contrast, if the servo sectors across the disks where not offset circumferentially but instead aligned, this delay would increase to approximately 2.0 servo sample intervals, thereby degrading the performance of the servoing.

Figure 3B:
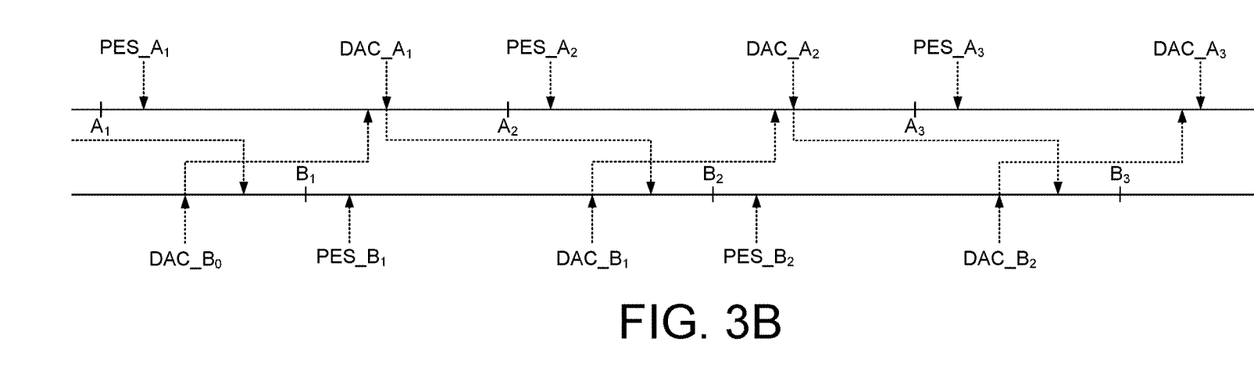
FIG. 3B shows an embodiment wherein at least part of the servo information is transmitted cross-channel full duplex.

In one embodiment illustrated in FIG. 3A, the control circuitry is configured to read one of the first servo sectors (e.g., servo sector $A_2$) while transmitting at least part of the first servo information (e.g., DAC_$A_1$) from the first servo channel to the second servo channel. Also in the embodiment of FIG. 3A, the control circuitry has finished the transmission of the first servo information before the second servo information (e.g., DAC_$B_1$) is transmitted from the second servo channel to the first servo channel. In this manner, the communication channel (e.g., serial channel) for transmitting the servo information cross-channel may be implemented as a half-duplex channel. In another embodiment illustrated in FIG. 3B, at least part of the cross-channel information for both servo channels may be transmitted concurrently using a full-duplex communication channel. Using a half-duplex communication channel may decrease the complexity of the circuitry but may require higher speed circuitry and/or a longer servo sample interval, whereas using a full-duplex communication channel may increase the complexity of the circuitry while decreasing the required speed and/or decreasing the servo sample interval.

Figure 3C:
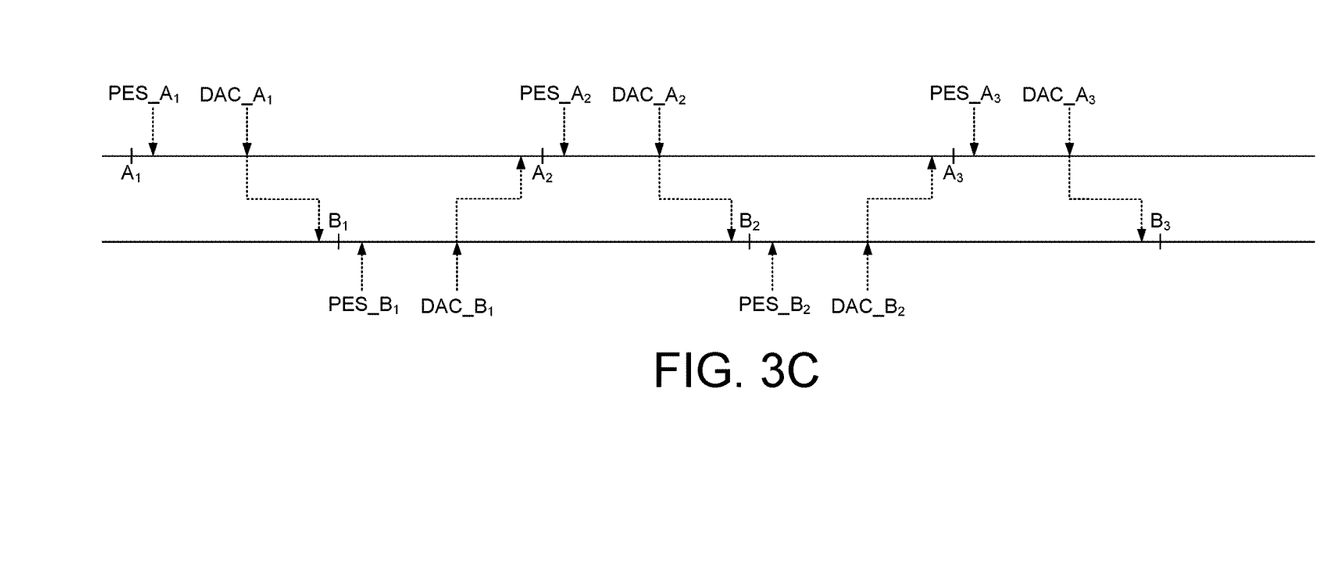
FIG. 3C shows an embodiment wherein servo information is transmitted cross-channel within a half servo sample interval in an interleaved manner so as to reduce the cross-channel servo sample delay.

FIG. 3C shows an embodiment wherein while the first and second disks are rotating the control circuitry is configured to generate the second command value (e.g., DAC_$B_2$) and transmit the first servo information (e.g., DAC_$A_2$) from the first servo channel to the second servo channel within half of the servo sample interval. In this embodiment, there is a delay of less than half of the servo sample interval between when the cross-channel DAC value is generated (e.g., DAC_$A_2$) and when the second servo channel DAC value generated (e.g., DAC_$B_2$) is, thereby increasing the performance of the servoing at the cost of higher speed circuitry.

Figure 5:
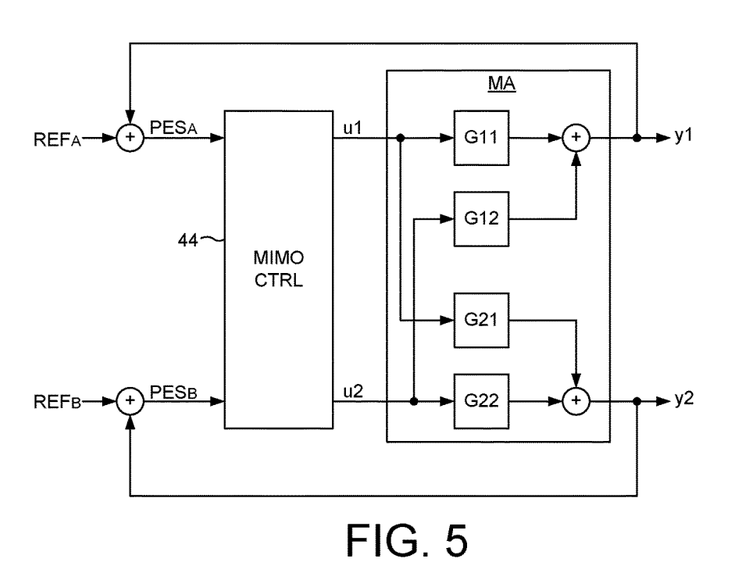
FIG. 5 shows control circuitry according to an embodiment comprising a multiple input multiple output (MIMO) control system configured to compensate for the coupling disturbance across the multiple actuators.

FIG. 5 shows an example embodiment wherein the first and second servo channels are represented generally by a multiple input multiple output (MIMO) control system 44 configured to compensate for the coupling disturbance across the multiple actuators. Each servo channel generates a control signal u1 and u2 representing the output of respective DACs, wherein command value u1 (e.g., DAC_Ai) is applied to a first actuator (e.g., VCM$_A$) represented by transfer function G11 and command value u2 (e.g., DAC_Bi) is applied to a second actuator (e.g., VCM$_B$) represented by transfer function G22. The coupling disturbance from the second actuator which affects the first actuator is represented by transfer function G12, and the coupling disturbance from the first actuator which affects the second actuator is represented by transfer function G21. The multiple actuators are collectively represented by transfer function MA having a first position signal output y1 representing a position of a first head 20A and a second position output signal y2 representing a position of a second head 20B. The position output signals are subtracted from respective reference signals REF$_A$ and REF$_B$ to generate respective position error signals PES$_A$ and PES$_B$ representing the multiple inputs of the MIMO control system.

Figure 6A:
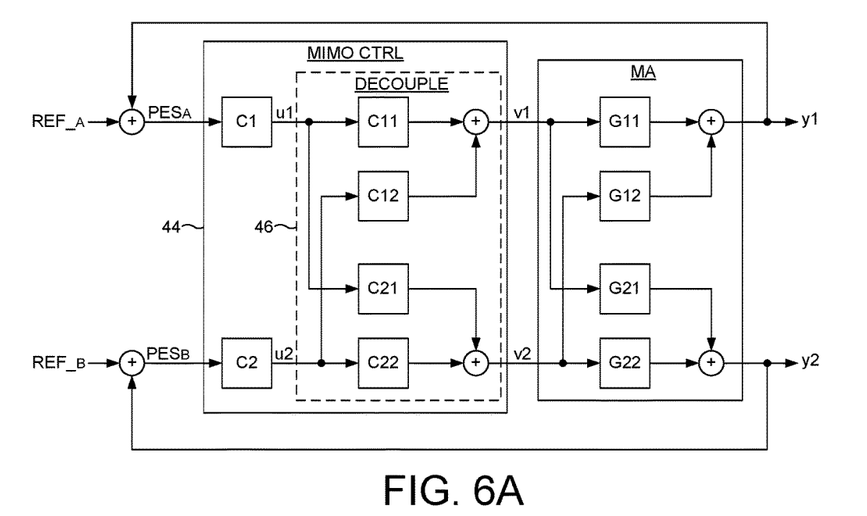
FIG. 6A shows an embodiment of a MIMO control system including a decoupling block implemented as part of a feedback compensator.

The MIMO control system 44 of FIG. 5 may be implemented in any suitable manner to compensate for the coupling disturbances across the multiple actuators. FIG. 6A shows an embodiment of a MIMO control system 44 wherein the first servo channel comprises a feedback compensator C1, and the second servo channel comprises a feedback compensator C2. A decouple block 46 processes the outputs u1 and u2 of the compensators C1 and C2 in order to attenuate the coupling disturbances G12 and G21. Consider the multiple outputs y1 and y2 may be represented as:

$$[y1 y2]^T = MA \cdot [v1 v2]^T$$

Defining the decouple as $C_{INV}$ then:

$$[v1 v2]^T = C_{INV} \cdot [u1 u2]^T$$

$C_{INV}$ can then be designed as:

$$C_{INV} = [C11 \quad C12; \quad C21 \quad C22]$$
$$= \widehat{MA}^{-1} \cdot [\widehat{G}11 \quad 0; \quad 0 \quad \widehat{G}22]$$

where $\widehat{MA}$ represents a combined model of the multiple actuators and $\widehat{MA}$ and $\widehat{MA}$ represent models of the respective individual actuators. The resulting control system can be represented as:

$$[y1 \quad y2]^T = MA \cdot \widehat{MA}^{-1} \cdot [\widehat{G}11 \quad 0; \quad 0 \quad \widehat{G}22] \cdot [u1 \quad u2]^T$$
$$= [G11 \quad 0; \quad 0 \quad G22] \cdot [u1 \quad u2]^T$$

resulting in:

$$y1 = \widehat{MA} \cdot u1$$

$$y2 = \widehat{MA} \cdot u2$$

thereby canceling the coupling disturbances.

Figure 6B:
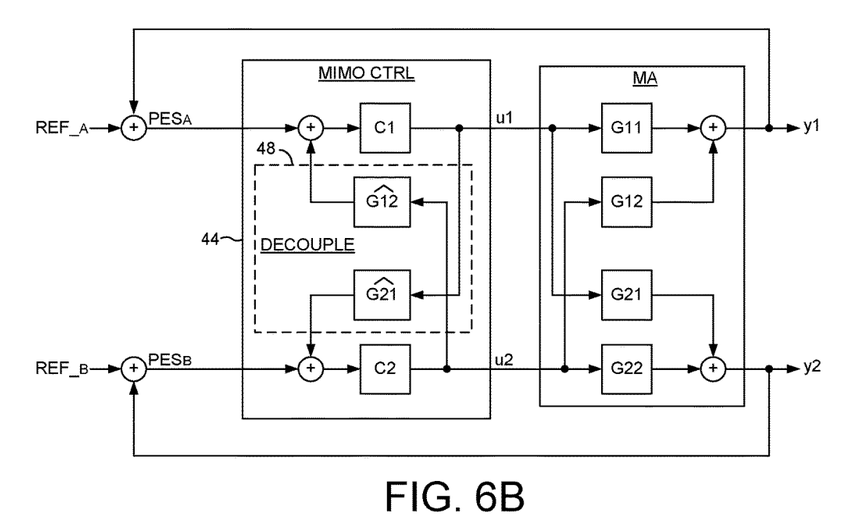
FIG. 6B shows an embodiment of a MIMO control system including a decoupling block implemented by canceling an estimated coupling disturbance from a position error signal.

FIG. 6B shows an alternative embodiment of a MIMO control system 44 for attenuating the coupling disturbances across the multiple actuators. In this embodiment, the coupling disturbance is attenuated in decoupling block 48 by subtracting the effect of the coupling disturbance from the PES so that:

$$u1 = C1 \cdot (PES_A - \widehat{MA} \cdot u2)$$

$$u2 = C2 \cdot (PES_B - \widehat{MA} \cdot u1)$$

where $\widehat{MA}$ and $\widehat{MA}$ are transfer functions that model the actual transfer functions G12 and G21 for the coupling disturbances shown in FIG. 6B. Any suitable technique may be employed to model the coupling disturbances, including to adaptively adjust the coupling models $\widehat{MA}$ and $\widehat{MA}$ based on the position error signals.

In the embodiments of FIGS. 6A and 6B, the command values u1 and u2 are transmitted cross-channel to the respective servo channels as described above in order to implement the decoupling blocks for attenuating the coupling disturbances. In other embodiments, the MIMO control system 44 may implement an alternative servo algorithm that may use different servo information transmitted cross-channel, such as a feedback compensator that process the PES generated by both servo channels. In yet another embodiment, the feedback compensators may process other (or additional) servo information, such as other state information generated by a state estimator within each servo channel. In yet another embodiment, the MIMO control system may be modified based on other servo information transmitted cross-channel, such as status of the servo channels (seeking, reading, writing, write inhibit, etc.), active head number, or radial location of the head (e.g., inner, middle, or outer diameter).

Referring again to FIG. 2B, in one embodiment at least part of the first servo channel 22A is implemented within a first integrated circuit, and at least part of the second servo channel 22B is implemented within a second integrated circuit, wherein the integrated circuits comprise suitable communication circuitry, such as suitable serial communication circuitry, for transmitting the servo information cross-channel between the integrated circuits. In an alternative embodiment, the first and second servo channels 22A and 22B are implemented within the same integrated circuit, and the servo information is communicated cross-channel by each servo channel accessing an internal or external memory circuit (e.g., DRAM, SRAM, Flash, etc.).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk comprising first servo sectors distributed around a circumference of the first disk;
   a first actuator configured to actuate a first head over the first disk;
   a first servo channel configured to control the first actuator;
   a second disk comprising second servo sectors distributed around a circumference of the second disk, wherein the second servo sectors are offset circumferentially from the first servo sectors;
   a second actuator configured to actuate a second head over the second disk;
   a second servo channel configured to control the second actuator; and
   control circuitry comprising the first and second servo channels, wherein while the first and second disks are rotating, the control circuitry is configured to:
      read one of the first servo sectors to generate first servo information;
      transmit the first servo information from the first servo channel to the second servo channel;
      read one of the second servo sectors to generate second servo information;
      generate a second command value based on the first servo information and the second servo information; and
      control the second actuator based on the second command value.

2. The data storage device as recited in claim 1, wherein:
   the first servo sectors are distributed evenly around the circumference of the first disk and separated by a servo sample interval;
   the second servo sectors are distributed evenly around the circumference of the second disk and separated by the servo sample interval; and
   the second servo sectors are offset circumferentially from the first servo sectors by half of the servo sample interval.

3. The data storage device as recited in claim 2, wherein while the first and second disks are rotating, the control circuitry is further configured to generate the second command value and transmit the first servo information from the first servo channel to the second servo channel within half of the servo sample interval.

4. The data storage device as recited in claim 1, wherein while the first and second disks are rotating, the control circuitry is further configured to read a subsequent one of the first servo sectors while transmitting at least part of the first servo information from the first servo channel to the second servo channel.

5. The data storage device as recited in claim 1, wherein the first servo information comprises a position error signal representing a position of the first head over the first disk.

6. The data storage device as recited in claim 1, wherein while the first and second disks are rotating, the control circuitry is further configured to:
   transmit the second servo information from the second servo channel to the first servo channel;
   generate a first command value based on the first servo information and the second servo information; and
   control the first actuator based on the first command value.

7. The data storage device as recited in claim 6, wherein the second servo information comprises the second command value.

8. The data storage device as recited in claim 6, wherein while the first and second disks are rotating the control circuitry is further configured to:
   transmit the first servo information from the first servo channel to the second servo channel half duplex; and
   transmit the second servo information from the second servo channel to the first servo channel half duplex.

9. The data storage device as recited in claim 6, wherein while the first and second disks are rotating, the control circuitry is further configured to:
   transmit at least part of the first servo information from the first servo channel to the second servo channel full duplex; and
   transmit at least part of the second servo information from the second servo channel to the first servo channel full duplex.

10. A method of operating a data storage device, comprising:
    while first and second disks of the data storage device are rotating:
       reading a first servo sector on the first disk to generate first servo information;
       transmitting the first servo information from a first servo channel to a second servo channel;
       reading a second servo sector on the second disk to generate second servo information;
       generating a second command value based on the first servo information and the second servo information; and
       controlling a second actuator based on the second command value to position a second head over the second disk,
       wherein the second servo sectors are offset circumferentially from the first servo sectors.

11. The method as recited in claim 10, wherein:
    the first servo sectors are distributed evenly around the circumference of the first disk and separated by a servo sample interval;
    the second servo sectors are distributed evenly around the circumference of the second disk and separated by the servo sample interval; and
    the second servo sectors are offset circumferentially from the first servo sectors by half of the servo sample interval.

12. The method as recited in claim 11, further comprising:
    while the first and second disks are rotating, generating the second command value and transmitting the first servo information from the first servo channel to the second servo channel within half of the servo sample interval.

13. The method as recited in claim 10, further comprising:
    while the first and second disks are rotating, reading a subsequent one of the first servo sectors while transmitting at least part of the first servo information from the first servo channel to the second servo channel.

14. The method as recited in claim 10, wherein the first servo information comprises a position error signal representing a position of a first head over the first disk.

15. The method as recited in claim 10, further comprising: while the first and second disks are rotating:
   transmitting the second servo information from the second servo channel to the first servo channel;
   generating a first command value based on the first servo information and the second servo information; and
   controlling a first actuator based on the first command value to position a first head over the first disk.

16. The method as recited in claim 15, wherein the second servo information comprises the second command value.

17. The method as recited in claim 15, further comprising: while the first and second disks are rotating:
   transmitting the first servo information from the first servo channel to the second servo channel half duplex; and
   transmitting the second servo information from the second servo channel to the first servo channel half duplex.

18. The method as recited in claim 15, further comprising: while the first and second disks are rotating:
   transmitting at least part of the first servo information from the first servo channel to the second servo channel full duplex; and
   transmitting at least part of the second servo information from the second servo channel to the first servo channel full duplex.

* * * * *